US010341616B2

(12) United States Patent
Lee et al.

(10) Patent No.: US 10,341,616 B2
(45) Date of Patent: Jul. 2, 2019

(54) SURVEILLANCE SYSTEM AND METHOD OF CONTROLLING THE SAME

(71) Applicant: Hanwha Techwin Co., Ltd., Changwon-si (KR)

(72) Inventors: Hwal Suk Lee, Changwon-si (KR); Soon Min Bae, Changwon-si (KR)

(73) Assignee: HANWHA TECHWIN CO., LTD., Changwon-si (KR)

( * ) Notice: Subject to any disclaimer, the term of this patent is extended or adjusted under 35 U.S.C. 154(b) by 250 days.

(21) Appl. No.: 15/185,225

(22) Filed: Jun. 17, 2016

(65) Prior Publication Data

US 2017/0118446 A1    Apr. 27, 2017

(30) Foreign Application Priority Data

Oct. 26, 2015    (KR) .................. 10-2015-0148829

(51) Int. Cl.
    *H04N 5/77*    (2006.01)
    *H04N 7/18*    (2006.01)

(52) U.S. Cl.
    CPC ............ *H04N 7/181* (2013.01); *H04N 5/77* (2013.01)

(58) Field of Classification Search
    CPC ............ H04N 5/92; H04N 7/18; H04N 7/181
    See application file for complete search history.

(56) References Cited

U.S. PATENT DOCUMENTS

| 6,636,256 | B1* | 10/2003 | Passman | G08B 13/19647 |
| | | | | 348/143 |
| 9,317,748 | B2* | 4/2016 | Yoneyama | G06K 9/00261 |
| 9,760,852 | B2* | 9/2017 | Hasan | G06Q 10/06398 |
| 2006/0087474 | A1* | 4/2006 | Do | G01S 1/024 |
| | | | | 342/386 |
| 2007/0139191 | A1* | 6/2007 | Quatro | G06Q 10/08 |
| | | | | 340/539.13 |
| 2007/0290924 | A1* | 12/2007 | McCoy | G06Q 10/087 |
| | | | | 342/464 |
| 2008/0303901 | A1* | 12/2008 | Variyath | G01S 5/02 |
| | | | | 348/143 |

(Continued)

FOREIGN PATENT DOCUMENTS

| KR | 10-2007-0044605 A | 4/2007 |
| KR | 10-0706903 B1 | 4/2007 |

(Continued)

*Primary Examiner* — Carlos Garcia
(74) *Attorney, Agent, or Firm* — Ladas & Parry LLP

(57) ABSTRACT

A surveillance system including a surveillance server and at least one network camera is provided. The network camera includes: a camera configured to capture images of a monitoring area; a communication interface configured to communicate with a server and a beacon terminal; and a processor configured to transmit a first beacon signal to the beacon terminal to receive a second beacon signal corresponding to the first beacon signal from the beacon terminal, generate beacon information and image information in response to receiving the second beacon signal, and transmit the beacon information and the image information to the server via the communication interface, wherein the beacon information includes location information of the beacon terminal, and the image information includes an image of a monitoring target that carries the beacon terminal.

20 Claims, 15 Drawing Sheets

(56) References Cited

U.S. PATENT DOCUMENTS

| | | | | |
|---|---|---|---|---|
| 2011/0026767 | A1* | 2/2011 | Miyazaki | H04N 5/23219 |
| | | | | 382/103 |
| 2014/0105454 | A1* | 4/2014 | Yoneyama | G06K 9/00664 |
| | | | | 382/103 |
| 2016/0210516 | A1* | 7/2016 | Kim | G06K 9/00751 |
| 2018/0103197 | A1* | 4/2018 | Campbell | H04N 5/23238 |

FOREIGN PATENT DOCUMENTS

| | | |
|---|---|---|
| KR | 10-2011-0071408 A | 6/2011 |
| KR | 10-1497814 B1 | 3/2015 |

* cited by examiner

SURVEILLANCE SYSTEM AND METHOD OF CONTROLLING THE SAME

CROSS-REFERENCE TO THE RELATED APPLICATION

This application claims priority from Korean Patent Application No. 10-2015-0148829, filed on Oct. 26, 2015, in the Korean Intellectual Property Office, the disclosure of which is incorporated herein in its entirety by reference.

BACKGROUND

1. Field

Apparatuses and methods consistent with exemplary embodiments relate to a surveillance system and a method of controlling the surveillance system.

2. Description of the Related Art

Recently, more and more cameras have been installed indoors, outdoors, or on the roads for various purposes such as crime prevention, security, and shop management. Such cameras are connected to one another via wires or wirelessly to function as network cameras.

Also, a manager who manages spaces where the cameras are installed may access the cameras via a personal computer to monitor remote spaces such as buildings or shops.

A beacon terminal, among near field communication devices according to the related art, measures distances between beacon terminals to identify a location of a person who carries around a beacon terminal, but may not identify a circumstance that the person who carries around the beacon terminal encounters.

SUMMARY

One or more exemplary embodiments provide a surveillance system capable of effectively monitoring a monitoring target by providing information about a location of the monitoring target and a method of controlling the surveillance system.

According to an aspect of an exemplary embodiment, there is provided a network camera including: a camera configured to capture images of a monitoring area; a communication interface configured to communicate with a server and a beacon terminal; and a processor configured to transmit a first beacon signal to the beacon terminal to receive a second beacon signal corresponding to the first beacon signal from the beacon terminal, generate beacon information and the image information, in response to receiving the second beacon signal, and transmit the beacon information and the image information to the server via the communication interface, wherein the beacon information may include location information of the beacon terminal, and the image information may include an image of a monitoring target that carries the beacon terminal.

The communication interface may communicate with the beacon terminal via near field wireless communication and may communicate with the server by connecting to a network via wired communication or wireless communication.

The beacon information may further include at least one of a network camera identification (ID), a beacon terminal ID, and time information representing a time point of detecting the monitoring target.

The time information may include a time of transmitting the first beacon signal or a time of receiving the second beacon signal.

The location information of the beacon terminal may include a distance between the network camera and the beacon terminal.

The image information may further include at least one of a network camera identification (ID) and time information representing a time point of capturing the image of the monitoring target.

According to an aspect of another exemplary embodiment, there is provided a surveillance server including: a communication interface configured to receive beacon information from a beacon terminal or a network camera, and to receive image information from the network camera; and a processor configured to generate location information of a monitoring target by using the beacon information and the image information, and transmit the location information of the monitoring target to a client terminal via the communication interface, wherein the beacon information may include location information of the beacon terminal, and the image information may include an image of the monitoring target that carries the beacon terminal.

The beacon information may include first time information representing a time of detecting the monitoring target, and the image information may include second time information representing a time of capturing the image, and the processor may match the beacon information and the image information to each other by using the first time information and the second time information, detect the monitoring target from the image information, generate an indicator for indicating the monitoring target in the image, and generate the location information of the monitoring target by combining the indicator with the image.

The processor may calculate a monitoring target area defined by coordinates and a size of the monitoring target, and generate the indicator for indicating the monitoring target area.

The processor may be configured to change a size of the monitoring target area in response to receiving a client input for changing the indicator from the client terminal, to change the location information of the monitoring target, and to transmit changed location information of the monitoring target to the client terminal.

The beacon information may include first time information representing a time of detecting the monitoring target, and the image information may include second time information representing a time of capturing the image, and the processor may match the beacon information and the image information to each other by using the first time information and the second time information, detect an event from the image information, extract an image of a predetermined period based on a time of detecting the event, and generate the location information of the monitoring target by combining extracted images.

The communication interface may be configured to receive first image information from a first network camera, second image information from a second network camera, and the beacon information and third image information from a third network camera, and the processor may be configured to generate first location information of the monitoring target by using the beacon information and the first image information, second location information of the monitoring target by using the beacon information and the second image information, and third location information of the monitoring target by using the beacon information and the third image information, and to generate route information of the monitoring target by using at least one of the first to third location information of the monitoring target, and to transmit the route information of the monitoring target to the client terminal.

The processor may be configured to detect an event from the first image information, to extract an image after a time of detecting the event from the first to third image information, and to generate the route information of the monitoring target by combining extracted image.

The processor may be configured to detect an event from the first image information, to extract an image of a predetermined period based on a time of detecting the event from the first image information, and to generate the route information of the monitoring target, which includes extracted images.

The processor may be configured to extract an image of a final section of an initial image in which the monitoring target firstly appears based on the first image information, to extract an image of an initial section and a final section of an intermediate image based on the second image information, or to extract an image of an initial section of a final image in which the monitoring target appears last based on the third image information, and to generate the route information by combining extracted images.

The processor may be configured to extract a first representative image based on the first image information, to extract a second representative image based on the second image information, or to extract a third representative image based on the third image information, and to generate the route information of the monitoring target by combining extracted images.

According to an aspect of another exemplary embodiment, there is provided a method of controlling a surveillance system comprising a network camera and a server, the method including: transmitting a first beacon signal from the network camera to a beacon terminal; receiving, in the network camera, a second beacon signal corresponding to the first beacon signal from the beacon terminal; generating, in the network camera, beacon information including location information of the beacon terminal and image information including an image of a monitoring target that carries the beacon terminal in response to receiving the second beacon signal; and transmitting the beacon information and the image information to the server which generates location information of the monitoring target by using the beacon information and the image information.

The beacon information may include first time information representing a time of receiving the second beacon signal, and the image information may include second time information representing a time of capturing the image, and the method may further include: matching, in the server, the beacon information and the image information to each other based on the first time information and the second time information; detecting the monitoring target from the image information; generating an indicator for indicating the monitoring target in the image; and generating location information of the monitoring target, in which the indicator is combined with the image.

The method further include: calculating a monitoring target area defined by coordinates and a size of the monitoring target, and generating the indicator for indicating the monitoring target area.

The beacon information may include first time information representing a time of receiving the second beacon signal, and the image information may include second time information representing a time of capturing the image, and the method may further include: matching, in the server, the beacon information and the image information to each other based on the first time information and the second time information; detecting an event from the image information; extracting an image of a predetermined period based on a time of detecting the event; and generating location information of the monitoring target by combining extracted images.

BRIEF DESCRIPTION OF THE DRAWINGS

The above and/or other aspects will become apparent and more readily appreciated from the following description of the exemplary embodiments, taken in conjunction with the accompanying drawings, in which.

DETAILED DESCRIPTION OF EXEMPLARY EMBODIMENTS

Figure 1:
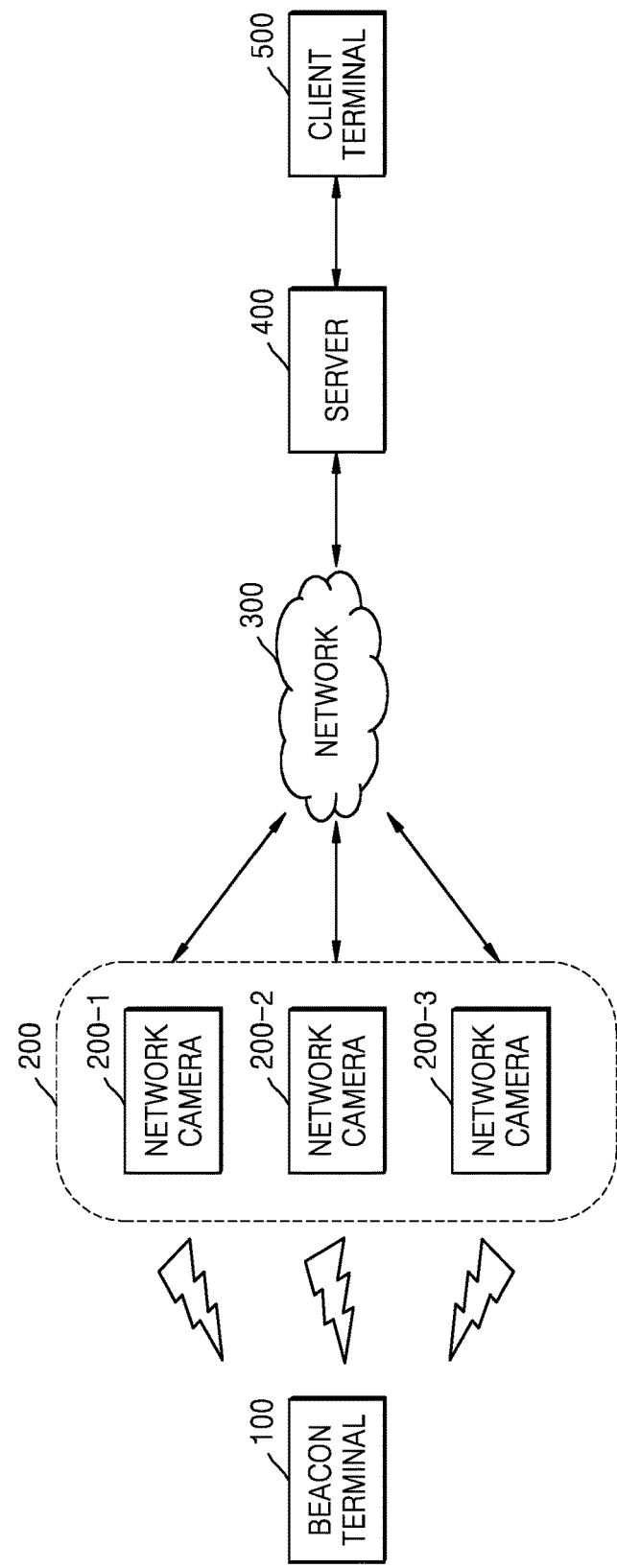
FIG. 1 is a block diagram of a surveillance system according to an exemplary embodiment.

Exemplary embodiments are described in detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list.

FIG. 1 is a block diagram of a surveillance system according to an exemplary embodiment.

Referring to FIG. 1, the surveillance system according to the exemplary embodiment may include a beacon terminal 100, network cameras 200, a network 300, and a server 400.

The surveillance system according to the exemplary embodiment may provide a monitoring result to a client terminal 500. The surveillance system according to another exemplary embodiment may change a monitoring result according to a client input transmitted from the client terminal 500, and then, provide the changed monitoring result to the client terminal 500.

Hereinafter, the beacon terminal 100 will be described in detail below with reference to FIG. 2.

Figure 2:
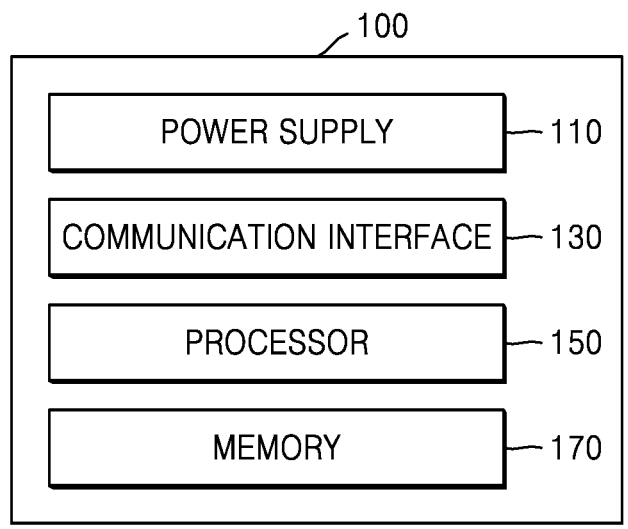
FIG. 2 is a block diagram of a beacon terminal according to an exemplary embodiment.

FIG. 2 is a block diagram of the beacon terminal 100 according to an exemplary embodiment.

Referring to FIG. 2, the beacon terminal 100 may include a power supply 110, a communication interface 130, a processor 150, and a memory 170.

The power supply 110 supplies, to the communication interface 130, the processor 150, and the memory 170, electric power that is necessary to operate the communication interface 130, the processor 150, and the memory 170. The power supply 110 may supply electric power of a predetermined level, and may be recharged or replaced.

The communication interface 130 transmits a beacon signal to outside, or receives a beacon signal from the outside. The communication interface 130 may communicate with the outside via near field wireless communication. For example, the communication interface 130 may perform near field wireless communication by using Bluetooth low energy (BLE) of Bluetooth 4.0.

The communication interface 130 may transmit a beacon signal to outside, and then, receive a beacon signal from the outside corresponding to the beacon signal that has been transmitted. Otherwise, the communication interface 130 may transmit a beacon signal corresponding to the beacon signal received from the outside, to the outside. The communication interface 130 may be implemented by a transceiver.

Although not shown in FIG. 2, the communication interface 130 may transmit beacon information to the server 400 via mobile communication.

The processor 150 may control overall operations of the power supply 110, the communication interface 130, the processor 150, and the memory 170.

The processor 150 may transmit a beacon signal to the outside with a predetermined period. The processor 150 may generate beacon information, when receiving a beacon signal corresponding to the beacon signal that has been transmitted to the outside.

The beacon information may include at least one of identification information of the beacon terminal 100, identification information of an external device to which the beacon signal corresponding to the beacon signal is transmitted, location information of the beacon terminal 100, and time information representing a time when the external device has sensed the beacon terminal 100.

The identification information of the beacon terminal 100 is exclusive information for distinguishing the beacon terminal 100 from other terminals, e.g., an identification (ID), a device name, a serial number, and a media access control (MAC) address.

The identification information of the external device is exclusive information for distinguishing the external device from other terminals, e.g., identification (ID), a device name, a serial number, and a media access control (MAC) address.

The location information of the beacon terminal 100 may include a distance between the external device and the beacon terminal 100.

The time information may include a time when the beacon terminal 100 has transmitted the beacon signal or a time when the beacon terminal 100 receives from the external device a beacon signal corresponding to the beacon signal transmitted by the beacon terminal 100.

The memory 170 may store the beacon signal and the beacon information.

Referring back to FIG. 1, the network cameras 200 may include a plurality of network cameras including first to third network cameras 200-1, 200-2, and 200-3.

Hereinafter, the network cameras 200 according to an exemplary embodiment will be described in detail below with reference to FIG. 3.

Figure 3:
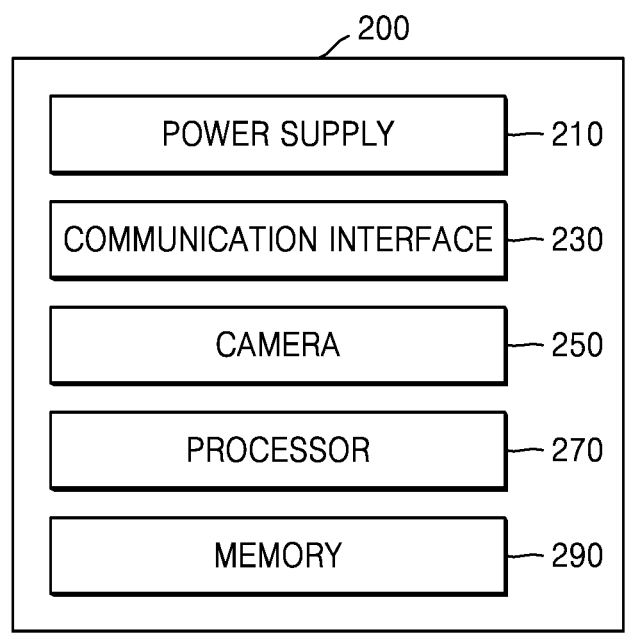
FIG. 3 is a block diagram of a network camera according to an exemplary embodiment.

FIG. 3 is a block diagram of a network camera 200 according to an exemplary embodiment.

Referring to FIG. 3, the network camera 200 may include a power supply 210, a communication interface 230, a camera 250, a processor 270, and a memory 290.

The power supply 210 supplies, to the communication interface 230, the camera 250, the processor 270, and the memory 290, electric power that is necessary to operate the communication interface 230, the camera 250, the processor 270, and the memory 290. The power supply 210 may supply electric power of a predetermined level. The power supply 210 may be a battery, and the network camera 200 may be a low power-consumption camera driven by the battery.

The communication interface 230 transmits a beacon signal to or receives a beacon signal from the beacon terminal 100. The communication interface 230 may communicate with the beacon terminal 100 via the near field wireless communication. For example, the communication interface 230 may perform the near field wireless communication by using the BLE of Bluetooth 4.0.

The communication interface 230 may transmit a beacon signal, and then, receive a beacon signal corresponding to the beacon signal that has been transmitted. Otherwise, the communication interface 230 may transmit to the beacon terminal 100 a beacon signal corresponding to the beacon signal received from the beacon terminal 100.

The communication interface 230 transmits beacon information or image information to the server 400. The communication interface 230 may be connected to the network 300 via wireless communication or wired communication to communicate with the server 400. Here, the communication interface 230 may communicate with the server 400 by using Internet protocol.

The camera 250 captures an image of a predetermined area. The camera 250 may capture an image of a monitoring target having the beacon terminal 100. The camera 250 may be a pan-tilt-zoom (PTZ) camera and may move and focus on different objects in the scene. For example, the camera may perform panning, tilting, and adjusting zoom magnification of a lens.

The processor 270 may control overall operations of the power supply 210, the communication interface 230, the camera 250, and the memory 290.

The processor 270 may transmit a beacon signal to the outside at a predetermined period. When receiving a beacon signal corresponding to the beacon signal transmitted to the outside, the processor 270 generates beacon information.

The beacon information may include at least one of identification information of the network camera 200, identification information of the beacon terminal 100, location information of the beacon terminal 100, and time information representing a time when the network camera 200 senses the beacon terminal 100.

The identification information of the network camera 200 is exclusive information for distinguishing the network camera 200 from the other network cameras, for example, an ID, a device name, a serial number, and a MAC address.

The identification information of the beacon terminal 100 is exclusive information for distinguishing the beacon terminal 100 from the other terminals.

The location information of the beacon terminal 100 may include a distance between the network camera 200 and the beacon terminal 100.

The time information may include a time when the network camera 200 transmits the beacon signal or a time when the beacon signal corresponding to the beacon signal transmitted by the network camera 200 is received from the beacon terminal 100. The time information may be first time information representing a time when the monitoring target that carries the beacon terminal 100 is detected.

After receiving the beacon signal corresponding to the beacon signal that has been transmitted to the outside, the processor 270 generates image information including an image of the monitoring target via the camera 250.

The image information may include at least one of the identification information of the network camera 200, the image of the monitoring target, and second time information representing a time when the image is captured.

The processor 270 may transmit the beacon information and the image information to the server 400 via the communication interface 230.

The memory 290 may store the beacon signal, the beacon information, and the image information.

Hereinafter, the server 400 according to an exemplary embodiment will be described in detail below with reference to FIG. 4.

Figure 4:
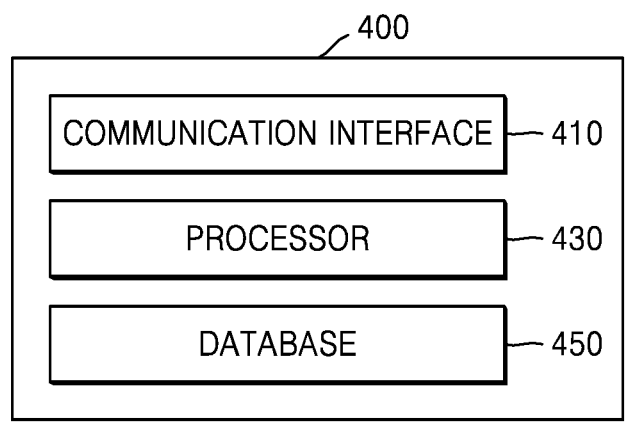
FIG. 4 is a block diagram of a server according to an exemplary embodiment.

FIG. 4 is a block diagram of the server 400 according to the exemplary embodiment.

Referring to FIG. 4, the server 400 may include a communication interface 410, a processor 430, and a database 450.

The communication interface 410 receives the beacon information and the image information. According to the exemplary embodiment, the communication interface 410 receives the beacon information from the beacon terminal 100 or the network camera 200, and receives the image information from the network camera 200. The communication interface 410 may receive the beacon information from the beacon terminal 100 via mobile communication, or may be connected to the network 300 via wireless communication or wired communication to receive the beacon information and/or the image information from the network camera 200.

The beacon information may include at least one of the identification information of the beacon terminal 100, the identification information of the network camera 200, the location information of the beacon terminal 100 including a distance between the beacon terminal 100 and the network camera 200, and first time information representing a time when the network camera 200 senses the beacon terminal 100, that is, the monitoring target carrying the beacon terminal 100.

The image information may include at least one of the identification information of the network camera 200, the image of the monitoring target, and second time information representing a time when the image of the monitoring target is captured.

The communication interface 410 transmits location information of the monitoring target to a client terminal 500. The communication interface 410 may receive a client input from the client terminal 500 and transmit location information of the monitoring target that is changed according to the client input to the client terminal 500.

The processor 430 may control overall operations of the communication interface 410 and the database 450.

The processor 430 generates location information of the monitoring target by using the beacon information and the image information.

According to an exemplary embodiment, the processor 430 matches the beacon information with the image information by using the first time information in the beacon information and the second time information in the image information and detect the monitoring target from the image information. The processor 430 may detect the network camera 200 that captures an image of the monitoring target carrying the beacon terminal 100 by matching the beacon information with the image information, and improve the monitoring accuracy by detecting the monitoring target from the image information. The processor 430 may use the location information of the beacon terminal 100 in order to detect the monitoring target from the image information, but is not limited thereto.

In addition, the processor 430 may calculate a monitoring target area from the image information. The monitoring target area denotes an area occupied by the monitoring target in the image and may be defined by coordinates and a size of the monitoring target. For example, the monitoring target area may be defined by an X coordinate and a Y coordinate of the monitoring target calculated based on a center point of the image, and a width and a height of the monitoring target calculated based on an entire size of the image.

The processor 430 may generate an indicator representing the monitoring target area. The indicator may have a two-dimensional (2D) shape. For example, the indicator may have the same shape as that of the monitoring target area, a shape surrounding the monitoring target area, and an arrow shape directed to the monitoring target area.

The processor 430 may generate location information of the monitoring target by combining the indicator with the image.

In addition, the processor 430 may change a size of the monitoring target area in response to the client input. The client input may be, for example, an input for changing coordinates or a size of the indicator indicating the monitoring target area. The processor 430 may enlarge the size of the monitoring target area in correspondence with the client input for enlarging the indicator, and accordingly, the indicator is combined with the image having a reduced transmission rate to change the location information of the monitoring target.

According to another exemplary embodiment, the processor 430 may match the beacon information with the image information by using the first time information in the beacon information and the second time information in the image information, and detect an event from the image information. The event may denote various circumstances that need to be monitored. For example, the event may include such cases that the monitoring target suddenly appears or disappears in the image, a location or a size of the monitoring target is suddenly changed, a crime scene is captured, and shouting or screaming sound is sensed.

The processor 430 may extract an image of a predetermined period based on a time point of detecting an event, and generate location information of the monitoring target by combining the extracted images. For example, the processor 430 may extract an image of a time period from 5 seconds earlier to 5 seconds later than the time point when the event is detected, and include the extracted image in the location information of the monitoring target.

If the communication interface 410 receives a plurality pieces of image information from a plurality of network cameras 200, the processor 430 generates a plurality pieces of location information of the monitoring target by using a plurality pieces of beacon information and the plurality pieces of image information, and generates route information of the monitoring target by using the plurality pieces of the location information of the monitoring target. Generation of the route information of the monitoring target will be described below with reference to FIGS. 10 to 15.

The database 450 stores at least one of the beacon information, the image information, and the location information of the monitoring target.

Hereinafter, the location information of the monitoring target will be described in detail below with reference to FIGS. 5 to 9.

Figure 5:
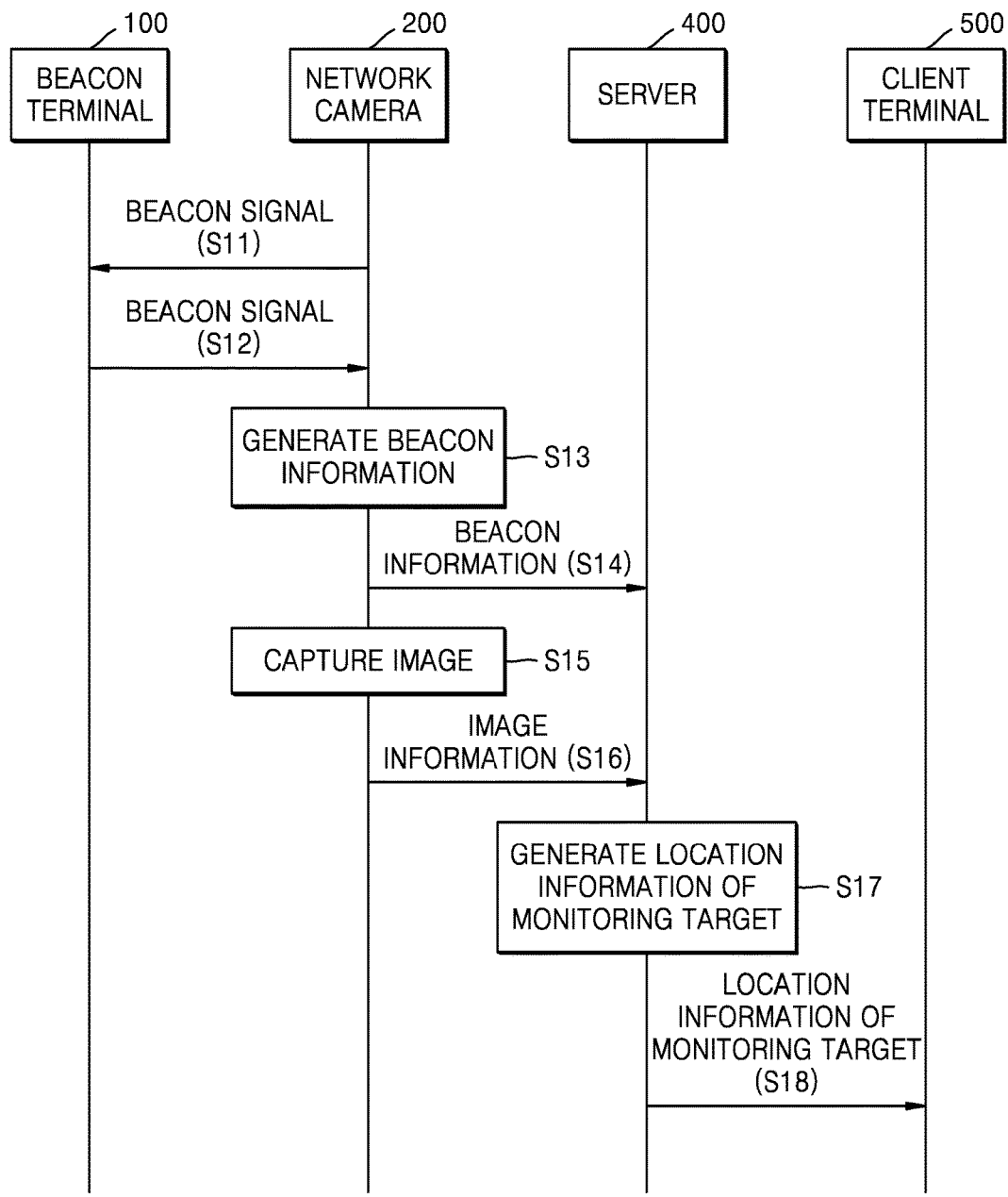
FIG. 5 is a flowchart for describing a method of controlling a surveillance system, according to an exemplary embodiment.

FIG. 5 is a flowchart for describing a method of controlling a surveillance system according to an exemplary embodiment.

Referring to FIG. 5, the network camera 200 transmits a beacon signal to the beacon terminal 100 (operation S11). For example, the network camera 200 may broadcast a beacon signal every second by using the BLE.

Next, the network camera 200 receives a beacon signal from the beacon terminal 100 (operation S12). For example, when the beacon terminal 100 approaches the network camera 200 within 50 m from the network camera 200 and receives the beacon signal transmitted from the network camera 200, the beacon terminal 100 may transmit to the network camera 200 a beacon signal corresponding to the beacon signal transmitted from the network camera 200 by using the BLE.

The network camera 200 which receives the beacon signal from the beacon terminal 100 may generate beacon information including location information of the beacon terminal 100, in response to receiving the beacon signal (operation S13). The location information of the beacon terminal 100 may include a distance between the beacon terminal 100 and the network camera 200 which senses the beacon terminal 100. The beacon information may include at least one of a beacon terminal ID for identifying the beacon terminal 100, a network camera ID for identifying the network camera 200, and first time information representing a time point when the network camera 200 receives the beacon signal from the beacon terminal 100.

The network camera 200 may transmit the beacon information to the server 400 (operation S14).

The network camera 200 acquires an image including an image obtained by capturing an image of the monitoring target carrying the beacon terminal 100, in response to the received beacon signal (operation S15), and transmits image information including the image to the server 400 (operation S16). The image information may include at least one of a network camera ID for identifying the network camera 200, the image including the monitoring target, and second time information representing a time point when the image has been captured.

The server 400 generates location information of the monitoring target by using the beacon information and the image information (operation S17). The location information of the monitoring target may include a location of the monitoring target in the image including the monitoring target, as well as a location of the network camera 200 that captures an image of the monitoring target.

Hereinafter, a method of generating the location information of the monitoring target according to an exemplary embodiment will be described in more detail below with reference to FIGS. 6 and 7.

Figure 6:
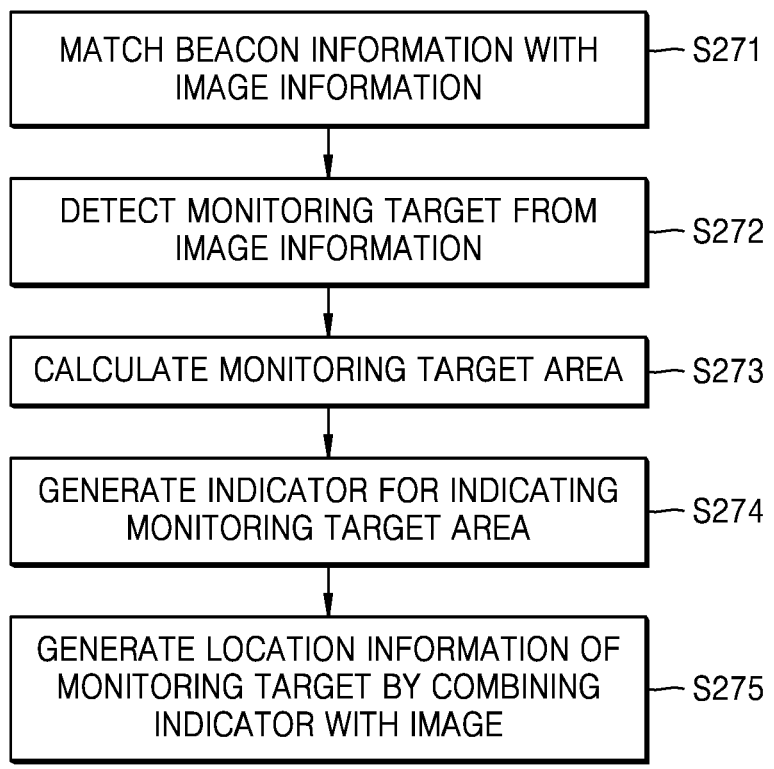
FIG. 6 is a flowchart for describing a method of generating location information of a monitoring target, according to an exemplary embodiment.

FIG. 6 is a flowchart for describing a method of generating the location information of the monitoring target, according to the exemplary embodiment.

Referring to FIG. 6, the server 400 matches the beacon information with the image information by using the first time information in the beacon information and the second time information in the image information (operation S271). The server 400 may identify the network camera 200 that has captured an image of the monitoring target carrying the beacon terminal 100, by matching the beacon information with the image information with each other.

The server 400 detects the monitoring target from the image information (operation S272). The server 400 detects the monitoring target from the image information to provide the circumstance that the monitoring target encounters, so as to improve the monitoring accuracy. The server 400 may use the location information of the beacon terminal 100 in order to detect the monitoring target from the image information, or may process the image.

The server 400 calculates the monitoring target area from the image information (operation S273). For example, the server 400 may calculate the monitoring target area defined by the X coordinate and the Y coordinate in the image, and a width and a height. The monitoring target area may have, for example, a circular shape, a square shape, or the same shape as the monitoring target.

In addition, the server 400 generates an indicator representing the monitoring target area (operation S274). The indicator may have, for example, the same shape as the monitoring target, a shape surrounding the monitoring target area, or an arrow directed to the monitoring target area.

Finally, the server 400 generates location information of the monitoring target by combining the indicator with the image (operation S275).

Figure 7:
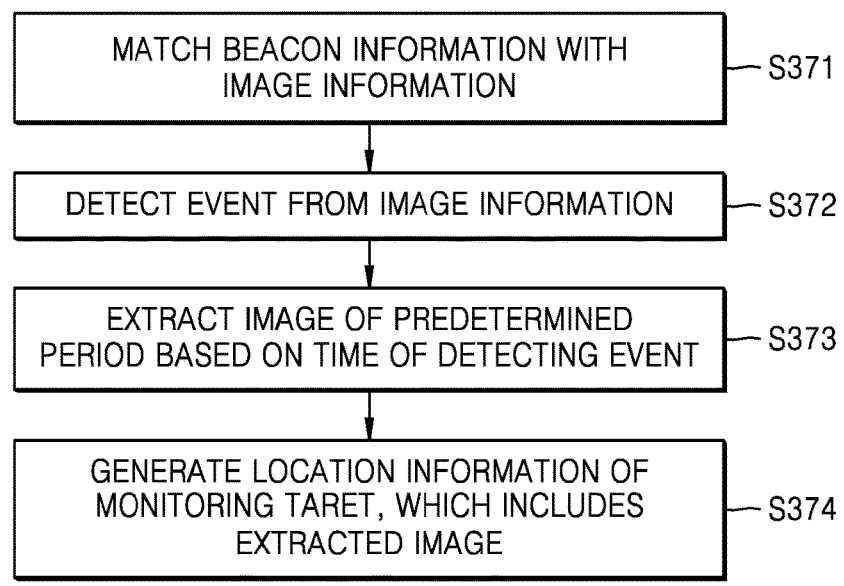
FIG. 7 is a flowchart for describing a method of generating location information of a monitoring target, according to another exemplary embodiment.

FIG. 7 is a flowchart for describing a method of generating location information of a monitoring target, according to another exemplary embodiment.

Referring to FIG. 7, the server 400 matches the beacon information with the image information by using the first time information in the beacon information and the second time information in the image information (operation S371).

In addition, the server 400 detects an event from the image information (operation S372). For example, the server 400 may detect at least one of an event that the monitoring target suddenly appears or disappears, an event that a location or a size of the monitoring target is suddenly changed, an event of capturing a crime scene, and an event of sensing shouting or screaming.

In addition, the server 400 extracts an image of a predetermined period based on the time point of detecting the event (operation S373). For example, the server 400 may extract the image from 5 seconds earlier to 5 seconds later than the time point of detecting the event.

Finally, the server 400 generates the location information of the monitoring target, which includes the extracted image (operation S374).

Referring back to FIG. 5, the server 400 provides the location information of the monitoring target to the client terminal 500 (operation S18).

The server 400 according to the exemplary embodiment may provide the location information of the monitoring target, which includes the image including the indicator indicating the monitoring target, to the client terminal 500.

A surveillance system according to another exemplary embodiment may provide the location information of the monitoring target, which only includes the image captured before and after detecting the event, to the client terminal 500.

Hereinafter, descriptions that are the same as the above may be omitted or briefly provided.

Figure 8:
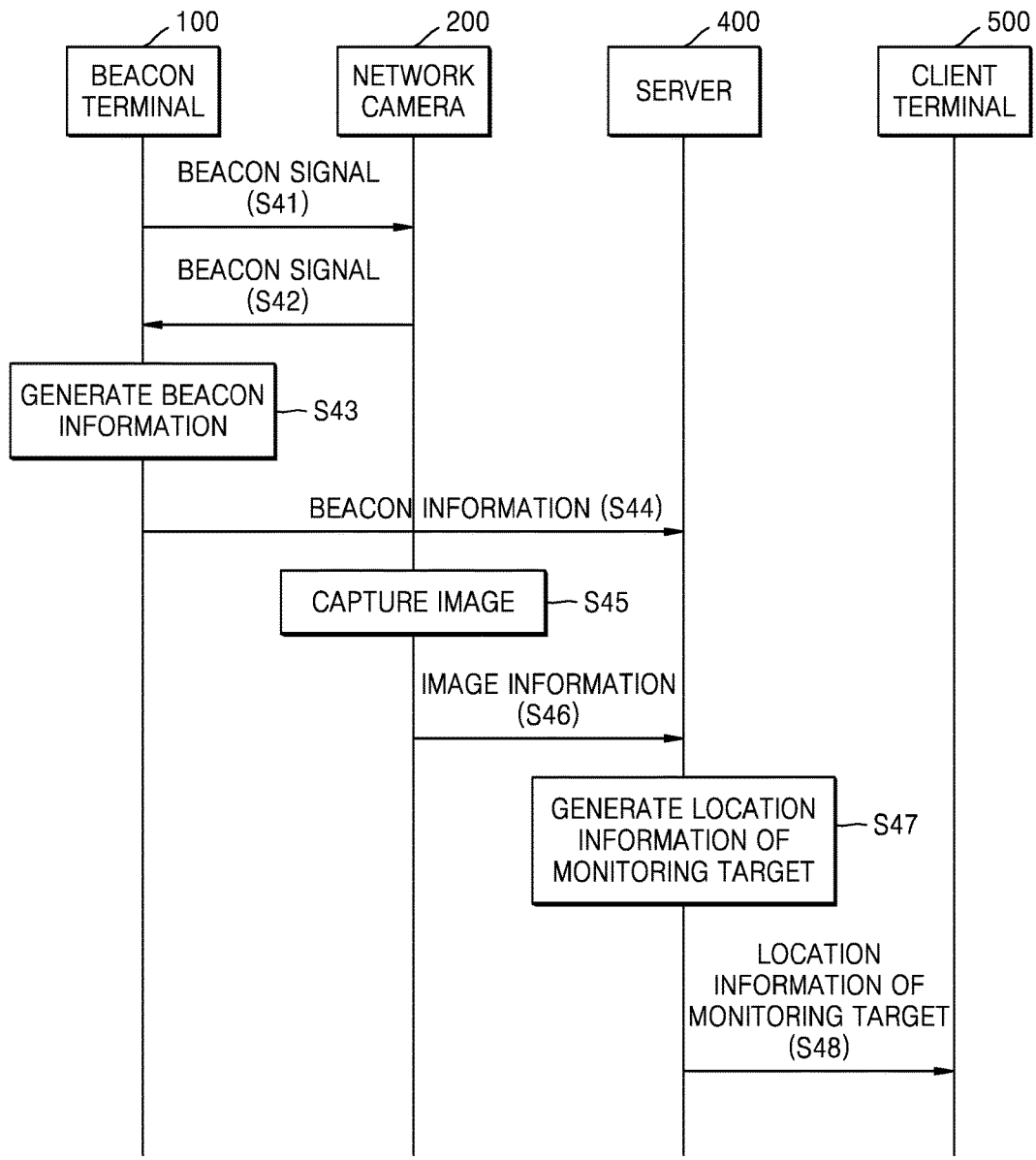
FIG. 8 is a flowchart for describing a method of controlling a surveillance system, according to an exemplary embodiment.

FIG. 8 is a flowchart for describing a method of controlling a surveillance system, according to another exemplary embodiment.

Referring to FIG. 8, the beacon terminal 100 transmits a beacon signal to the network camera 200 (operation S41). For example, the beacon terminal 100 may broadcast a beacon signal every second by using the BLE.

In addition, the beacon terminal 100 receives a beacon signal from the network camera 200 (operation S42). For example, when the beacon terminal 100 approaches the network camera 200 within a range of 50 m, the network camera 200 which receives the beacon signal transmitted from the beacon terminal 100 may transmit a beacon signal corresponding to the received beacon signal to the beacon terminal 100.

The beacon terminal 100 which receives the beacon signal from the network camera 200 may generate beacon information including the location information of the network camera 200, in response to the beacon signal (operation S43). The location information of the network camera 200 may include a distance between the network camera 200 and the beacon terminal 100 sensed by the network camera 200. The beacon information may include at least one of a beacon terminal ID for identifying the beacon terminal 100, a network camera ID for identifying the network camera 200 that transmits the beacon signal corresponding to the beacon signal transmitted by the beacon terminal 100, and first time information representing a time when the beacon terminal 100 receives the beacon signal from the network camera 200.

The beacon terminal 100 transmits the beacon information to the server 400 (operation S44).

The network camera 200 acquires an image including an image of the monitoring target carrying the beacon terminal 100 (operation S45) and transmits image information including the image to the server 400 (operation S46). The image information may include at least one of the network camera ID for identifying the network camera 200, the image including the monitoring target, and the second time information representing the time of capturing the image.

The server 400 generates location information of the monitoring target by using the beacon information and the image information (operation S47) and provides the location information of the monitoring target to the client terminal 500 (operation S48).

Figure 9:
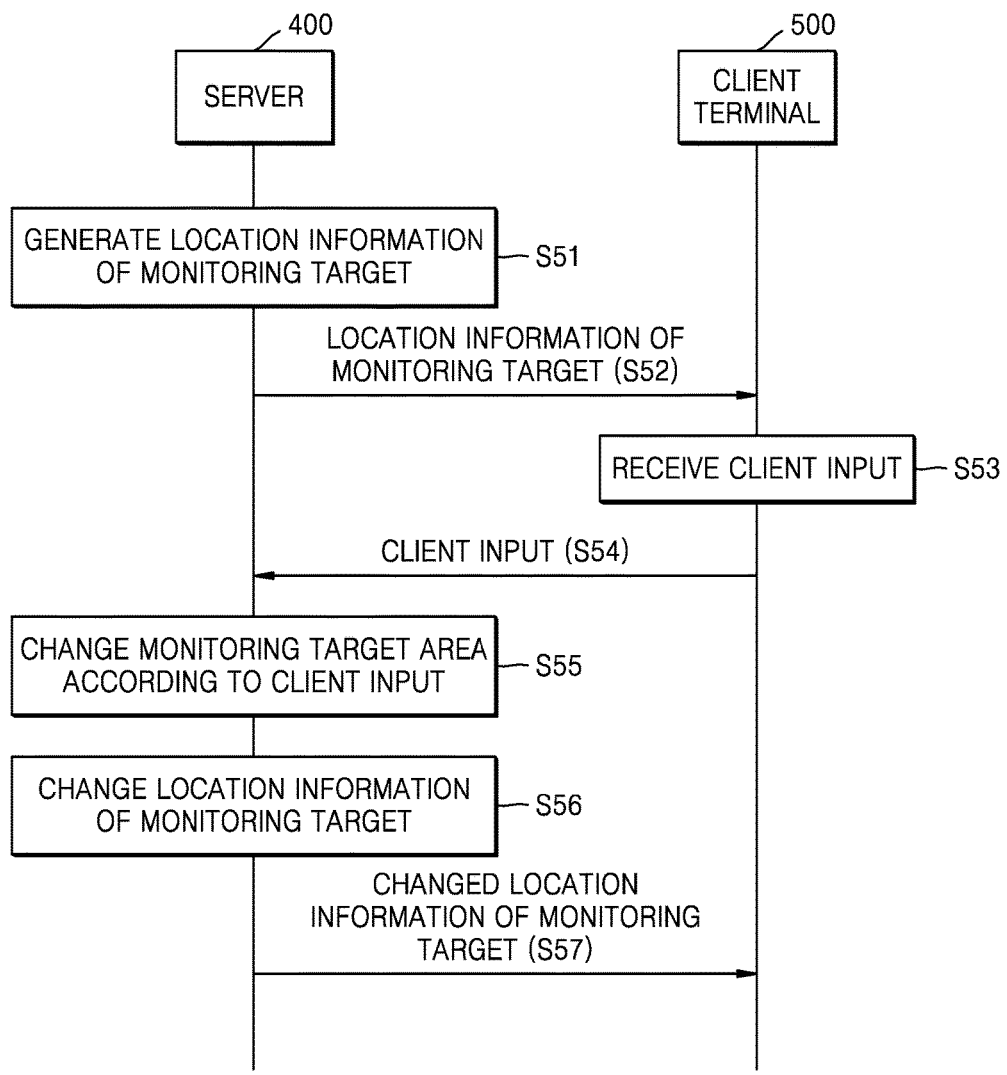
FIG. 9 is a flowchart for describing a method of changing location information of a monitoring target, according to an exemplary embodiment.

FIG. 9 is a flowchart for describing a method of changing location information of the monitoring target, according to an exemplary embodiment.

Referring to FIG. 9, the server 400 generates location information of the monitoring target (operation S51) and provides the location information of the monitoring target to the client terminal 500 (operation S52). If the client terminal 500 receives a client input (operation S53), the client terminal 500 transmits the client input to the server 400 (operation S54). The client input may be, for example, an input for changing a coordinate or a size of the indicator that indicates the monitoring target area.

The server 400 changes the monitoring target area according to the client input (operation S55). For example, the server 400 may expand a size of the monitoring target area in response to the client input for enlarging the indicator.

In addition, the server 400 combines the indicator with the image to which the changed monitoring target area is applied, to change the location information of the monitoring target (operation S56). For example, the server 400 may change the location information of the monitoring target by combining the indicator with the image of which quality is degraded and transmission ratio is reduced due to enlarged size.

The server 400 provides the changed location information of the monitoring target to the client terminal 500 (operation S57).

As described above, the surveillance system according to the exemplary embodiment may provide the changed location information of the monitoring target according to a request of the client, as well as the location information of the monitoring target, to the client terminal 500, and accordingly, may efficiently monitor the monitoring target.

Hereinafter, route information of the monitoring target according to one or more exemplary embodiments will be described in detail below with reference to FIGS. 10 to 15.

Figure 10:
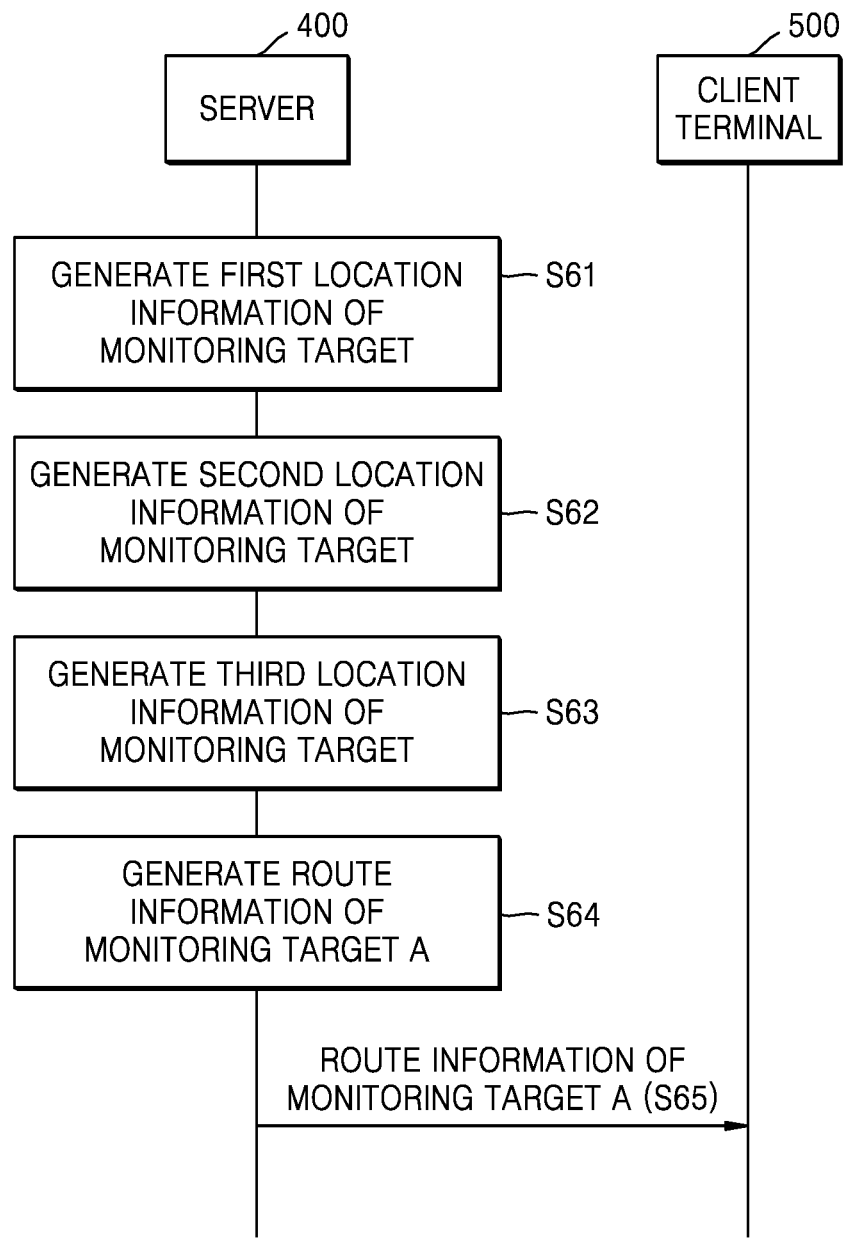
FIG. 10 is a flowchart for describing a method of providing route information of a monitoring target, according to an exemplary embodiment.

FIG. 10 is a flowchart for describing a method of providing route information of the monitoring target, according to an exemplary embodiment.

Referring to FIG. 10, the server 400 generates first location information of the monitoring target by using beacon information transmitted from the beacon terminal 100 or the first network camera 200-1 (see FIG. 1) and first image information transmitted from the first network camera 200-1 (see FIG. 1) (operation S61).

Next, the server 400 generates second location information of the monitoring target by using the beacon information transmitted from the beacon terminal 100 or the second network camera 200-2 (see FIG. 1) and second image information transmitted from the second network camera 200-2 (see FIG. 1) (operation S62).

Next, the server 400 generates third location information of the monitoring target by using the beacon information transmitted from the beacon terminal 100 or the third network camera 200-3 (see FIG. 1) and third image information transmitted from the third network camera 200-3 (see FIG. 1) (operation S63).

The server 400 generates route information of a monitoring target A with respect to the monitoring target by using at least one of the first to third location information of the monitoring target (operation S64). The first to third location information of the monitoring target may be sequentially generated, but is not limited thereto. Hereinafter, the route information of the monitoring target will be described in more detail below with reference to FIG. 11.

Figure 11:
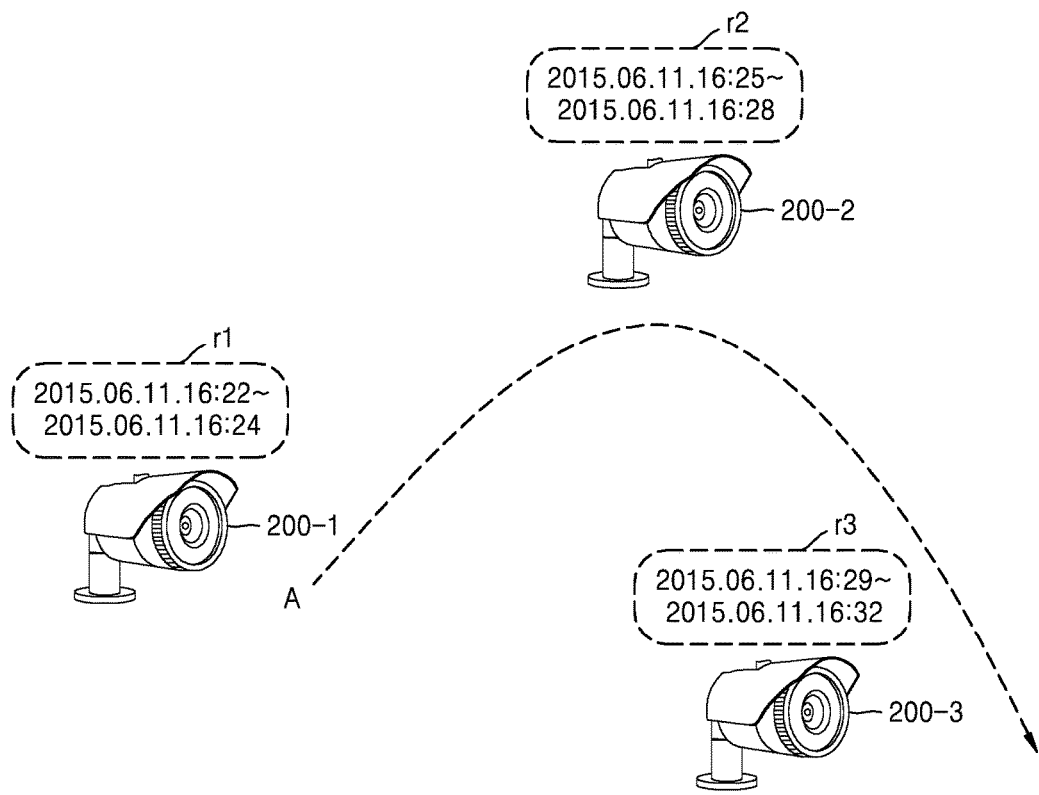
FIG. 11 is a diagram illustrating route information of a monitoring target, according to an exemplary embodiment.

FIG. 11 is a diagram for describing the route information of the monitoring target according to an exemplary embodiment.

Referring to FIG. 11, a monitoring target A carrying the beacon terminal 100 sequentially moves through the first network camera 200-1, the second network camera 200-2, and the third network camera 200-3.

The server 400 may match, for example, the first time information in the beacon information transmitted from the beacon terminal 100 or the first network camera 200-1 with the second time information in first image information transmitted from the first network camera 200-1. Then, the server 400 may generate first location information r1 of the monitoring target A, which includes an image captured by the first network camera 200-1 on Jun. 11, 2015 from 16:22 to 16:24.

In addition, the server 400 may match the first time information in the beacon information transmitted from the beacon terminal 100 or the second network camera 200-2 with the second time information in second image information transmitted from the second network camera 200-2. Then, the server 400 may generate second location information r2 of the monitoring target A, which includes an image captured by the second network camera 200-2 on Jun. 11, 2015 from 16:25 to 16:28.

In addition, the server 400 may match the first time information in the beacon information transmitted from the beacon terminal 100 or the third network camera 200-3 with the second time information in third image information transmitted from the third network camera 200-3. Then, the server 400 may generate third location information r3 of the monitoring target A, which includes an image captured by the third network camera 200-3 on Jun. 11, 2015 from 16:29 to 16:32.

Finally, the server 400 may generate the route information of the monitoring target A by using at least one of the first location information r1, the second location information r2, and the third location information r3 of the monitoring target A. Hereinafter, each of the exemplary embodiments in which the server 400 generates the route information of the monitoring target A by using at least one of the first to third location information r1, r2, and r3 of the monitoring target will be described in detail below with reference to FIGS. 12 to 15.

Figure 12:
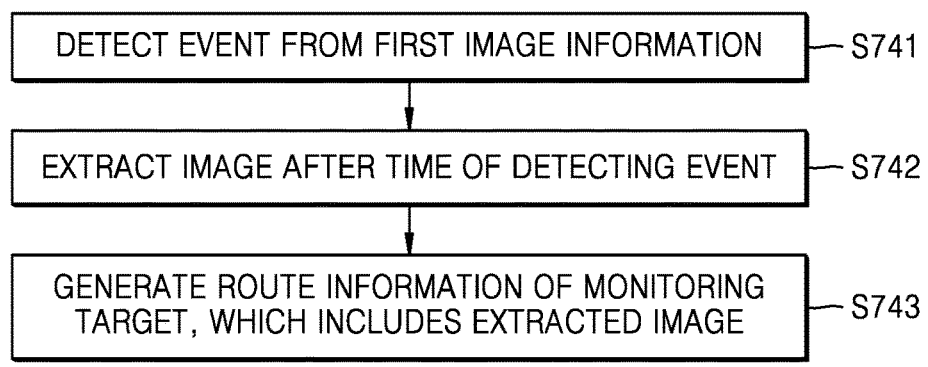
FIG. 12 is a flowchart for describing a method of generating route information of a monitoring target, according to an exemplary embodiment.

FIG. 12 is a flowchart for describing a method of generating route information of the monitoring target, according to an exemplary embodiment.

Referring to FIG. 12, the server 400 detects an event from the first image information (operation S741). For example, an event that the monitoring target A suddenly disappears from a capturing area of the first network camera 200-1 at 16:23, on Jun. 11, 2015 may be detected.

Next, the server 400 extracts an image captured after the time point of detecting the event (operation S742). For example, the server 400 may extract the image captured by the first network camera 200-1 after 16:23 on Jun. 11, 2015. Also, the server 400 may respectively extract an image captured by the second network camera 200-2 on Jun. 11, 2015 from 16:25 to 16:28, and an image captured by the third network camera 200-3 on Jun. 11, 2015 from 16:29 to 16:32.

In addition, the server 400 generates route information of the monitoring target, which includes the extracted images (operation S743). For example, the server 400 may generate the route information of the monitoring target by combining the image captured by the first network camera 200-1 after 16:23 on Jun. 11, 2015, the image captured by the second network camera 200-2 on Jun. 11, 2015 from 16:25 to 16:28, and the image captured by the third network camera 200-3 on Jun. 11, 2015 from 16:29 to 16:32.

Figure 13:
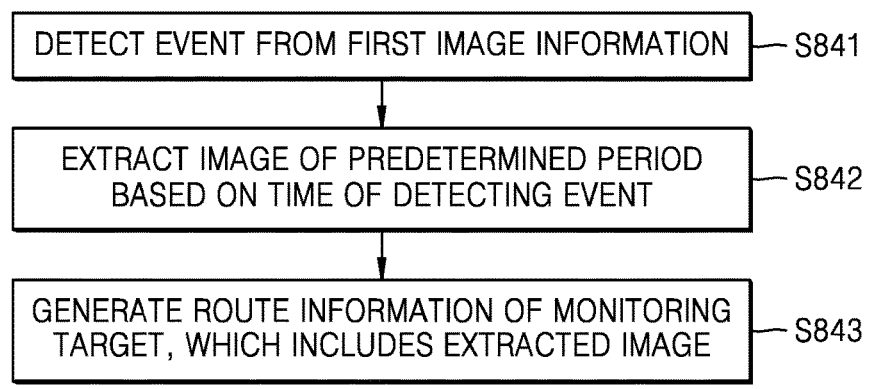
FIG. 13 is a flowchart for describing a method of generating route information of a monitoring target, according to another exemplary embodiment.

FIG. 13 is a flowchart for describing a method of generating route information of a monitoring target, according to another exemplary embodiment.

Referring to FIG. 13, the server 400 detects an event from the first image information (operation S841). For example, an event that the monitoring target A suddenly disappears from a capturing area of the first network camera 200-1 at 16:23 on Jun. 11, 2015 may be detected.

Then, the server 400 extracts an image of a predetermined period based on the time point of detecting the event (operation S842). For example, the server 400 may extract an image captured by the first network camera 200-1 from 5 seconds earlier than 16:23 to 5 seconds later than 16:23 on Jun. 11, 2015.

Next, the server 400 generates the route information of the monitoring target, which includes extracted images (operation S843). For example, the server 400 may generate the route information of the monitoring target, which includes the image captured by the first network camera 200-1 from 5 seconds earlier to 5 seconds later than 16:23 on Jun. 11, 2015.

Figure 14:
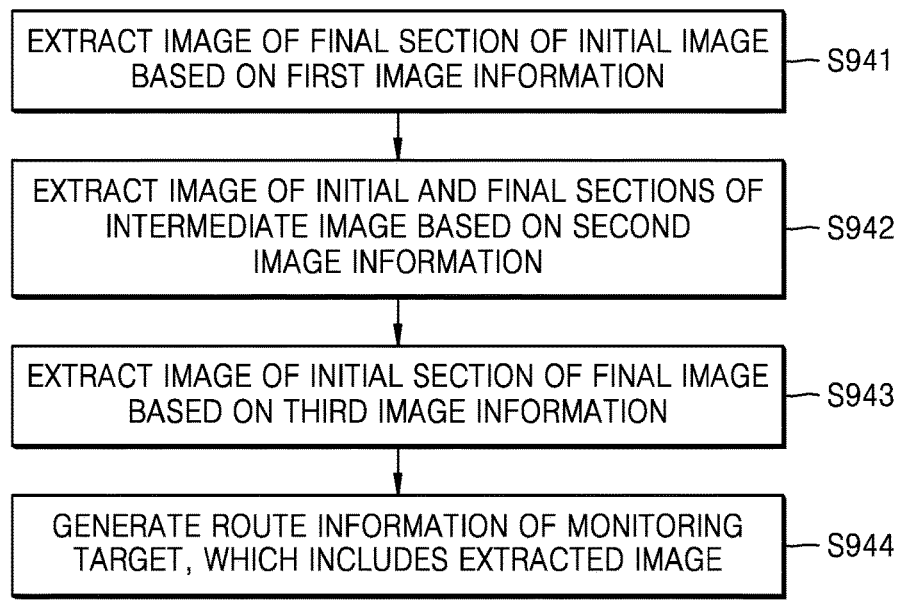
FIG. 14 is a flowchart for describing a method of generating route information of a monitoring target, according to another exemplary embodiment.

FIG. 14 is a flowchart for describing a method of generating route information of the monitoring target, according to another exemplary embodiment.

Referring to FIG. 14, the server 400 extracts a final section of an initial image from which the monitoring target is firstly detected based on the first image information (operation S941). For example, the server 400 may extract an image captured by the first network camera 200-1 from 16:24:55 to 16:25:00 on Jun. 11, 2015.

In addition, the server 400 extracts an image of an initial section and a final section of an intermediate image, based on the second image information (operation S942). For example, the server 400 may extract images captured by the second network camera 200-2 from 16:25:00 to 16:25:05 on Jun. 11, 2015, and from 16:28:55 to 16:29:00 on Jun. 11, 2015.

Next, the server 400 extracts an image of an initial section of a final image from which the monitoring target is detected last (operation S943). For example, the server 400 may extract an image captured by the third network camera 200-3 from 16:32:55 to 16:33:00 on Jun. 11, 2015.

Finally, the server 400 generates the route information of the monitoring target, which includes extracted images (operation S944). For example, the server 400 may generate the route information of the monitoring target by combining the image captured by the first network camera 200-1 from 16:24:55 to 16:25:00 on Jun. 11, 2015, the image captured by the second network camera 200-2 from 16:25:00 to 16:25:05 and from 16:28:55 to 16:29:00 on Jun. 11, 2015, and the image captured by the third network camera 200-3 from 16:32:55 to 16:33:00 on Jun. 11, 2015.

Figure 15:
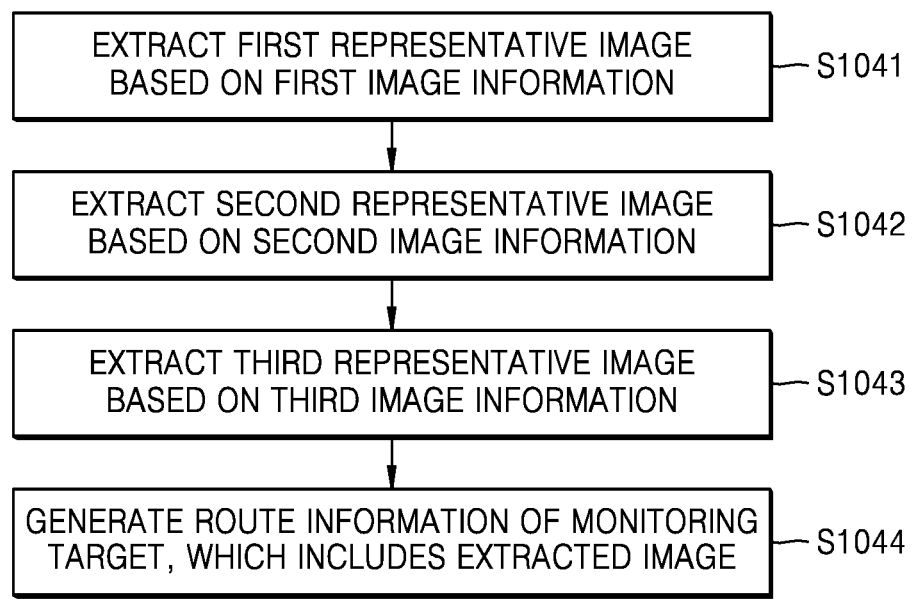
FIG. 15 is a flowchart for describing a method of generating route information of a monitoring target, according to another exemplary embodiment.

FIG. 15 is a flowchart for describing a method of generating route information of the monitoring target, according to another exemplary embodiment.

Referring to FIG. 15, the server 400 extracts a first representative image based on the first image information (operation S1041), extracts a second representative image based on the second image information (operation S1042), and extracts a third representative image based on the third image information (operation S1043).

The first to third representative images may be, for example, a still image in which the monitoring target firstly appears, a still image in which the monitoring target appears last, and a still image in which the monitoring target area is the largest in size, but are not limited thereto.

In addition, the server 400 generates the route information of the monitoring target, which includes the extracted images (operation S1044).

Referring back to FIG. 10, the server 400 provides the route information of the monitoring target to the client terminal 500 (operation S65).

According to one or more exemplary embodiments, information about a circumstance in which a monitoring target encounters, as well as a location of the monitoring target, is provided, and thus, the surveillance system and method may effectively monitor the monitoring target.

While not restricted thereto, the operations or steps of the methods or algorithms according to the above exemplary embodiments may also be embodied as computer readable codes on a non-transitory computer readable recording medium. The non-transitory computer readable recording medium is any data storage device that can store programs or data which can be thereafter read by a computer system. Examples of the non-transitory computer readable recording medium may include read-only memory (ROM), random-access memory (RAM), CD-ROMs, magnetic tapes, hard disks, floppy disks, flash memory, optical data storage devices, and so on. Also, the non-transitory computer readable recording medium can also be distributed over network coupled computer systems so that the computer readable code is stored and executed in a distributive manner. Also, the operations or steps of the methods or algorithms according to the above exemplary embodiments may be written as a computer program transmitted over a computer-readable transmission medium, such as a carrier wave, and received and implemented in general-use or special-purpose digital computers that execute the programs. Moreover, it is understood that in exemplary embodiments, one or more units (e.g., those represented by blocks as illustrated in FIGS. 2, 3, and 4) of the above-described apparatuses and devices may include or be implemented by circuitry, a processor, a microprocessor, etc., and may execute a computer program stored in a computer-readable medium.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope of the inventive concept as defined by the appended claims.

What is claimed is:

1. A network camera comprising:
    a camera configured to capture images of a monitoring area;
    a communication interface configured to communicate with a server and a beacon terminal; and
    a processor configured to transmit a first beacon signal to the beacon terminal to receive a second beacon signal corresponding to the first beacon signal from the beacon terminal, generate beacon information and image information, in response to receiving the second beacon signal, and transmit the beacon information and the image information to the server via the communication interface,
    wherein the beacon information comprises location information of the beacon terminal, and the image information comprises an image of a monitoring target that carries the beacon terminal.

2. The network camera of claim 1, wherein the communication interface communicates with the beacon terminal via near field wireless communication and communicates with the server by connecting to a network via wired communication or wireless communication.

3. The network camera of claim 1, wherein the beacon information further comprises at least one of a network camera identification (ID), a beacon terminal ID, and time information representing a time point of detecting the monitoring target.

4. The network camera of claim 3, wherein the time information comprises a time of transmitting the first beacon signal or a time of receiving the second beacon signal.

5. The network camera of claim 1, wherein the location information of the beacon terminal comprises a distance between the network camera and the beacon terminal.

6. The network camera of claim 1, wherein the image information further comprises at least one of a network camera identification (ID) and time information representing a time point of capturing the image of the monitoring target.

7. A surveillance server comprising:
    a communication interface configured to receive beacon information from a beacon terminal or a network camera, and to receive image information from the network camera; and
    a processor configured to generate location information of a monitoring target by using the beacon information and the image information, and transmit the location information of the monitoring target to a client terminal via the communication interface,
    wherein the beacon information comprises location information of the beacon terminal and the image information comprises an image of the monitoring target that carries the beacon terminal.

8. The surveillance server of claim 7, wherein the beacon information comprises first time information representing a time of detecting the monitoring target, and the image information comprises second time information representing a time of capturing the image, and the processor is further configured to match the beacon information and the image information to each other by using the first time information and the second time information, detect the monitoring target from the image information, generate an indicator for indicating the monitoring target in the image, and generate the location information of the monitoring target by combining the indicator with the image.

9. The surveillance server of claim 8, wherein the processor is further configured to calculate a monitoring target area defined by coordinates and a size of the monitoring target, and generate the indicator for indicating the monitoring target area.

10. The surveillance server of claim 9, wherein the processor is further configured to change a size of the monitoring target area in response to receiving a client input for changing the indicator from the client terminal, to change the location information of the monitoring target, and to transmit changed location information of the monitoring target to the client terminal.

11. The surveillance server of claim 7, wherein the beacon information comprises first time information representing a time of detecting the monitoring target, and the image information comprises second time information representing a time of capturing the image, and the processor is further configured to match the beacon information and the image information to each other by using the first time information and the second time information, detect an event from the image information, extract an image of a predetermined period based on a time of detecting the event, and generate the location information of the monitoring target by combining extracted images.

12. The surveillance server of claim 7, wherein the communication interface is further configured to receive first image information from a first network camera, second image information from a second network camera, and the beacon information and third image information from a third network camera, and the processor is further configured to generate first location information of the monitoring target by using the beacon information and the first image information, second location information of the monitoring target by using the beacon information and the second image information, and third location information of the monitoring target by using the beacon information and the third image information, to generate route information of the monitoring target by using at least one of the first to third location information of the monitoring target, and to transmit the route information of the monitoring target to the client terminal.

13. The surveillance server of claim 12, wherein the processor is further configured to detect an event from the first image information, to extract an image after a time of detecting the event from the first to third image information, and to generate the route information of the monitoring target by combining extracted image.

14. The surveillance server of claim 12, wherein the processor is further configured to detect an event from the first image information, to extract an image of a predetermined period based on a time of detecting the event from the first image information, and to generate the route information of the monitoring target, which includes extracted images.

15. The surveillance server of claim 12, wherein the processor is further configured to extract an image of a final section of an initial image in which the monitoring target firstly appears based on the first image information, to extract an image of an initial section and a final section of an intermediate image based on the second image information, or to extract an image of an initial section of a final image in which the monitoring target appears last based on the third image information, and to generate the route information by combining extracted images.

16. The surveillance server of claim 12, wherein the processor is further configured to extract a first representative image based on the first image information, to extract a second representative image based on the second image information, or to extract a third representative image based on the third image information, and to generate the route information of the monitoring target by combining extracted images.

17. A method of controlling a surveillance system comprising a network camera and a server, the method comprising:
transmitting a first beacon signal from the network camera to a beacon terminal;
receiving, in the network camera, a second beacon signal corresponding to the first beacon signal from the beacon terminal;
generating, in the network camera, beacon information comprising location information of the beacon terminal and image information comprising an image of a monitoring target that carries the beacon terminal in response to receiving the second beacon signal; and
transmitting the beacon information and the image information to the server which generates location information of the monitoring target by using the beacon information and the image information.

18. The method of claim 17, wherein the beacon information comprises first time information representing a time of receiving the second beacon signal, and the image information comprises second time information representing a time of capturing the image, and
the method further comprising:
matching, in the server, the beacon information and the image information to each other based on the first time information and the second time information;
detecting the monitoring target from the image information;
generating an indicator for indicating the monitoring target in the image; and
generating location information of the monitoring target, in which the indicator is combined with the image.

19. The method of claim 18, further comprising:
calculating a monitoring target area defined by coordinates and a size of the monitoring target; and
generating the indicator for indicating the monitoring target area.

20. The method of claim 18, wherein the beacon information comprises first time information representing a time of receiving the second beacon signal, and the image information comprises second time information representing a time of capturing the image, and
the method further comprising:
matching, in the server, the beacon information and the image information to each other based on the first time information and the second time information;
detecting an event from the image information;
extracting an image of a predetermined period based on a time of detecting the event; and
generating location information of the monitoring target by combining extracted images.

* * * * *